United States Patent
Knausz et al.

(10) Patent No.: US 9,298,314 B2
(45) Date of Patent: Mar. 29, 2016

(54) MITIGATION OF DISPLAY UPDATE NOISE USING PROXIMATELY DISPOSED COUPLING ELECTRODE

(71) Applicant: Synaptics Incorporated, San Jose, CA (US)

(72) Inventors: Imre Knausz, Fairport, NY (US); Eric Scott Bohannon, Henrietta, NY (US); Christopher A. Ludden, Pittsford, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/308,986

(22) Filed: Jun. 19, 2014

(65) Prior Publication Data

US 2015/0220206 A1    Aug. 6, 2015

Related U.S. Application Data

(60) Provisional application No. 61/935,724, filed on Feb. 4, 2014.

(51) Int. Cl.
*G06F 3/045* (2006.01)
*G06F 3/041* (2006.01)
*G06F 3/044* (2006.01)

(52) U.S. Cl.
CPC .............. *G06F 3/0418* (2013.01); *G06F 3/044* (2013.01); *G06F 3/0412* (2013.01)

(58) Field of Classification Search
CPC ... G06F 3/03547; G06F 3/041; G06F 3/0412; G06F 3/0414; G06F 3/046; G06F 3/047; G06F 2203/041; G06F 3/044; G06F 3/045; G06F 3/0418

USPC ............. 345/156, 173, 174; 178/18.01–18.09
See application file for complete search history.

(56) References Cited

U.S. PATENT DOCUMENTS

| 5,952,998 A | 9/1999 | Clancy et al. |
| 2005/0012219 A1 | 1/2005 | Liou |
| 2008/0062148 A1 | 3/2008 | Hotelling et al. |
| 2009/0315570 A1 | 12/2009 | Chappell et al. |
| 2010/0001973 A1 | 1/2010 | Hotelling et al. |
| 2010/0193257 A1 | 8/2010 | Hotelling et al. |

(Continued)

FOREIGN PATENT DOCUMENTS

KR    1020120105445    9/2012

OTHER PUBLICATIONS

International Search Report and Written Opinion dated Apr. 10, 2015 for Application No. PCT/US2015/012741.

*Primary Examiner* — Rodney Amadiz
(74) *Attorney, Agent, or Firm* — Patterson + Sheridan, LLP

(57) ABSTRACT

Embodiments include a method (as well as an input device and processing system) that includes driving a display signal onto at least one of a plurality of display electrodes for updating a display, and driving an input sensing signal onto at least one of a plurality of sensor electrodes, where driving the input sensing and driving the display signal at least partially overlap in time. The method further includes receiving, using a coupling electrode disposed proximate to the at least one display electrode, a coupling signal that represents an effect of a signal on at least one of the display electrodes, on a signal on at least one of the sensor electrodes, acquiring resulting signals with at least one of the sensor electrodes, and adjusting the resulting signals based on the coupling signal.

22 Claims, 11 Drawing Sheets

(56) References Cited

U.S. PATENT DOCUMENTS

| | | |
|---|---|---|
| 2010/0194695 A1 | 8/2010 | Hotelling et al. |
| 2011/0210941 A1 | 9/2011 | Reynolds et al. |
| 2011/0284949 A1 | 11/2011 | Meng et al. |
| 2011/0298746 A1 | 12/2011 | Hotelling |
| 2012/0026123 A1 | 2/2012 | Grunthaner et al. |
| 2012/0182251 A1 | 7/2012 | Krah |
| 2013/0057511 A1 | 3/2013 | Shepelev et al. |
| 2013/0176251 A1 | 7/2013 | Wyatt et al. |
| 2013/0194229 A1 | 8/2013 | Sabo et al. |
| 2013/0215075 A1 | 8/2013 | Lee et al. |
| 2014/0176496 A1* | 6/2014 | Azumi et al. ............... 345/174 |
| 2015/0091851 A1* | 4/2015 | Reynolds ............ G06F 3/0412 345/174 |
| 2015/0309612 A1* | 10/2015 | Morein ............ G06F 3/0412 345/174 |

\* cited by examiner

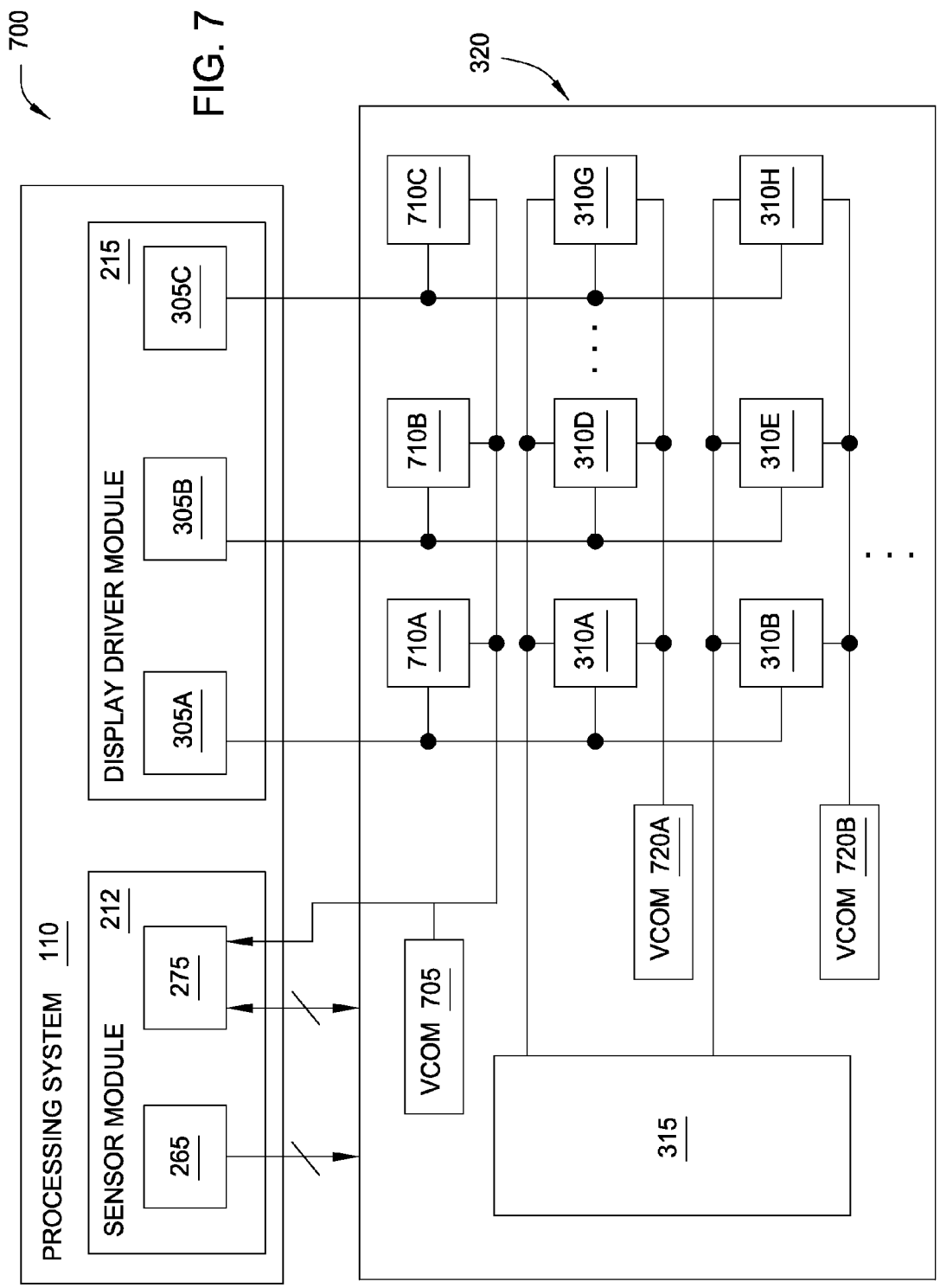

MITIGATION OF DISPLAY UPDATE NOISE USING PROXIMATELY DISPOSED COUPLING ELECTRODE

CROSS-REFERENCE TO RELATED APPLICATIONS

This application claims benefit of U.S. provisional patent application Ser. No. 61/935,724, filed Feb. 4, 2014 entitled "Display Noise Cancelation", which is herein incorporated by reference.

BACKGROUND OF THE INVENTION

1. Field of the Invention

Embodiments of the present invention generally relate to a method and apparatus for compensating for noise introduced between display updating systems and input sensing systems.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

One embodiment described herein is an input device that includes a plurality of display electrodes, a plurality of sensor electrodes, and a coupling electrode disposed proximate to at least one of the plurality of display electrodes. The input device further includes a processing system that is coupled to the plurality of display electrodes, the plurality of sensor electrodes, and to the coupling electrode. The processing system is configured to drive the plurality of display electrodes to update a display, to receive a coupling signal with the coupling electrode that represents an effect of at least one of the plurality of display electrodes on at least one of the sensor electrodes, and to acquire resulting signals with at least one of the sensor electrodes, and to adjust the resulting signals based on the coupling signal.

Another embodiment described herein is a processing system that includes a plurality of source drivers configured to drive a plurality of display electrodes to update a display. The processing system further includes a sensing module that includes a plurality of receivers configured to couple to a plurality of sensor electrodes to perform input sensing, where driving the plurality of display electrodes creates an effect on one or more of the plurality of sensor electrodes that is represented by a coupling signal received with a coupling electrode, and where the processing system is configured to acquire resulting signals with at least one of the sensor electrodes and adjust the resulting signals based on the coupling signal.

Another embodiment described herein is a method that includes driving a display signal onto at least one of a plurality of display electrodes for updating a display, and driving an input sensing signal onto at least one of a plurality of sensor electrodes, where driving the input sensing and driving the display signal at least partially overlap in time. The method further includes receiving, using a coupling electrode disposed proximate to the at least one display electrode, a coupling signal that represents an effect of at least one of the display electrodes on at least one of the sensor electrodes, acquiring resulting signals with at least one of the sensor electrodes, and adjusting the resulting signals based on the coupling signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 is a schematic block diagram of an input device, according to one embodiment described herein.

Figure 1:
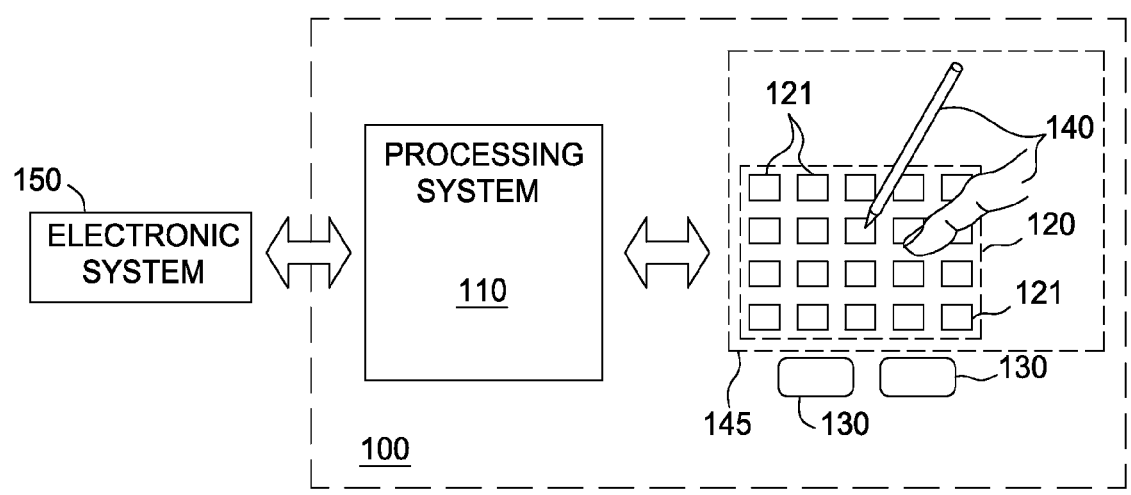
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Capacitive sensing in an integrated display (i.e., a display that outputs images in addition to providing a capacitive sensing region) has many challenges including routing and signal settling which can cause deterioration of either the capacitive sensing performance (e.g., a decreased signal-to-noise ratio, or SNR) or of the display performance (e.g., visible artifacts near sensor electrodes). For example, the selection and update of display pixels in the integrated display can interfere electrically with the accurate measurement of charge coupling affected by an input object. One solution is to make the display update settling time and the touch sensing update settling time non-overlapping. Doing so prevents the electrical modulation of capacitive touch sensing from affecting the voltages or currents in the display pixels (e.g., while the source drivers are coupled to the display pixels by the gate line selection) especially for display updating. However, achieving simultaneous capacitive sensing and display updating can provide significantly improved performance, due to the significantly increased time during which both capacitive sensing and display updating can be performed. Simultaneous capacitive sensing and display updating can be accomplished by choosing appropriate parameters for the capacitive sensing signals and display signals (such as update frequency, phase, and/or location of the signals), as well as by compensating for charge induced by the display updating signals (i.e., noise) onto the capacitive sensing components.

In one embodiment, an input device includes a processing system configured to drive a plurality of display electrodes to update a display. To determine an amount of charge introduced into the sensor electrodes as a result of driving the display electrodes, the processing system includes a coupling electrode proximate to at least one of the display electrodes. The coupling electrode receives a coupling signal representing the effect of a signal on at least one display electrode on a signal on at least one sensor electrode. The processing device may then compensate for the introduced charge by adjusting the signals acquired at the sensor electrodes, based on the received coupling signal. Using analog methods to compensate for noise may be particularly advantageous as being simpler in implementation than comparable digital methods, and require less power and less area for electronic components.

In some embodiments, the coupling electrode is capacitively coupled to one or more source driver electrodes. The coupling signal received by the coupling electrode may be provided as an input to a current mirror, which may be included in a Coarse Background Compensation (CBC) current conveyor. An output of the current mirror may then be used to adjust the signals acquired at the sensor electrodes in order to compensate for the noise introduced by the display signals on the source driver electrodes.

In other embodiments, each of a plurality of coupling electrodes is directly coupled to a corresponding source driver electrode. The coupling signals obtained by each of the coupling electrodes may reflect the dynamic output current from each of the source drivers. The coupling signals may be modified (such as by scaling and/or summing the coupling signals) in order to determine a cumulative effect of display updating on the capacitive sensing system. The individual coupling signals, or their determined cumulative effect, may be used to adjust the signals acquired at the sensor electrodes in order to compensate for the introduced noise.

In some embodiments, one or more coupling electrodes correspond to multiple source lines of a display. The coupling electrodes may also correspond to sensor electrodes, or to groups of sensor electrodes. In these embodiments, the coupling electrodes may be disposed in an integrated circuit, or may be disposed on the display itself (for example, proximate to a source line fan out area where display electrodes are wired or otherwise electrically connected to their drivers).

FIG. 1 is a schematic block diagram of an input device 100, in accordance with embodiments described herein. Although the illustrated embodiments of the present disclosure are shown with an input device 100 comprising a display device integrated with a sensing device, it is contemplated that the invention may be embodied in sensing devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc.

In some embodiments, the sensing region 120 has a rectangular shape when projected onto an input surface of the input device 100.

The input device 100 may utilize any combination of sensor components and sensing technologies to detect user input in the sensing region 120. The input device 100 comprises a plurality of sensing elements 121 for detecting user input. The input device 100 may include one or more sensing elements 121 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive. Although not shown, the sensing elements 121 may be capacitive sensing pixels that include one or more sensor or other electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. The change in capacitive coupling may be between sensor electrodes in two different sensing elements 121 or between two different sensor electrodes in the same sensing element 121. In various embodiments, an input object near the sensor electrodes alters the electric field between the sensor electrodes, thus changing the measured capacitive coupling. In one implementation, a transcapacitance sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) 121 of the input device 100. In other embodiments, components of processing system 110 are physically separate with one or more components close to sensing element(s) 121 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing elements 121 to detect input, identification modules configured to identify gestures such as mode changing gestures, and mode changing modules for changing operation modes. In one embodiment, processing system 110 includes at least one sensor module, and a display driver module, each of which will be described more fully below.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 121 of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensing elements 121. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a display region 145 in addition to the sensing region 120 (e.g., a touch screen interface), and the sensing region 120 overlaps at least part of an active area of a display screen of the display region 145. For example, the input device 100 may comprise substantially transparent sensing elements overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The sensing region 120 and the display region 145 may share physical elements. For example, some embodiments may utilize some of the same electrical components for displaying and for sensing. As another example, the display device may be operated in part or in total by the processing system 110 (e.g., by display driver module 215).

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
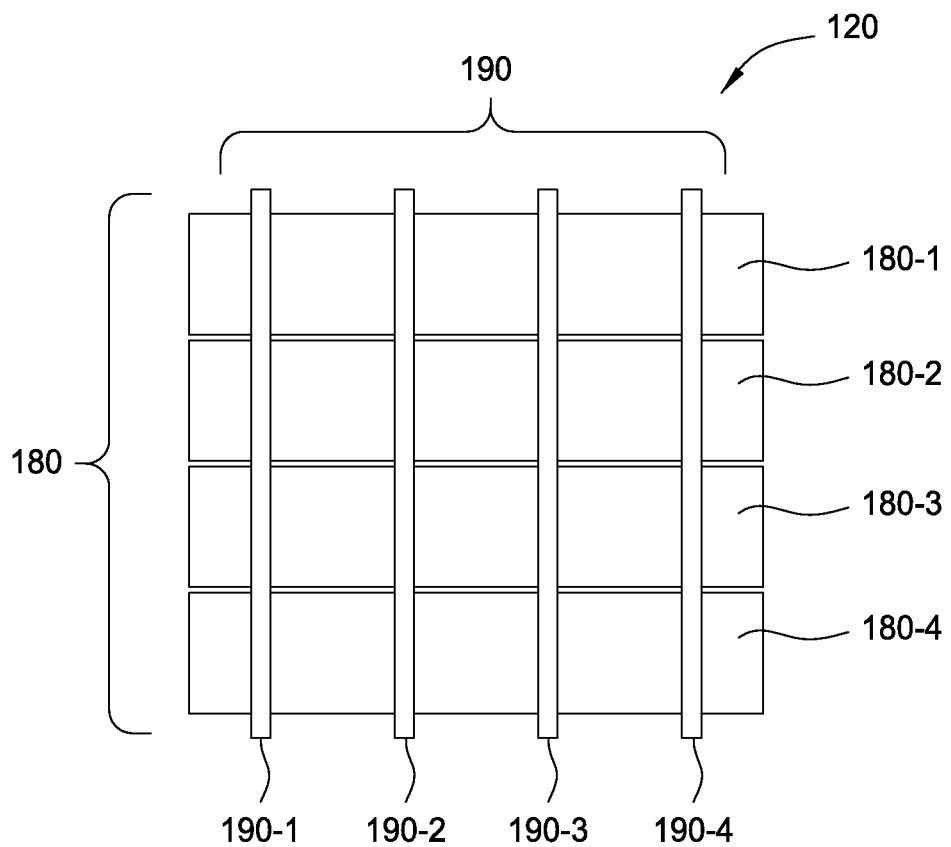
FIGS. 2A-2B illustrate portions of exemplary patterns of sensing elements or capacitive sensing pixels, according to embodiments described herein.

FIG. 2A illustrates a portion of a pattern of sensing elements configured to sense in a sensing region 120 associated with the pattern, according to some embodiments. For clarity of illustration and description, FIG. 2A shows the sensing elements in a pattern of simple rectangles, and does not show various components. This pattern of sensing elements comprises a first plurality of sensor electrodes 180 (180-1, 180-2, 180-3, ... 180-$n$), and a second plurality of sensor electrodes 190 (190-1, 190-2, 190-3, ... 190-$n$) disposed over the plurality of sensor electrodes 180. In one embodiment, this pattern of sensing elements comprises a plurality of transmitter electrodes 180 (180-1, 180-2, 180-3, ... 180-$n$), and a plurality of receiver electrodes 190 (190-1, 190-2, 190-3, ... 190-$n$) disposed over the plurality of transmitter electrodes 180. In another embodiment, the first plurality of sensor electrodes may be configured to transmit and receive and the second plurality of sensor electrodes may also be configured to transmit and receive.

Transmitter electrodes 180 and receiver electrodes 190 are typically ohmically isolated from each other. That is, one or more insulators separate transmitter electrodes 180 and receiver electrodes 190 and prevent them from electrically shorting to each other. In some embodiments, transmitter electrodes 180 and receiver electrodes 190 are separated by insulative material disposed between them at cross-over areas; in such constructions, the transmitter electrodes 180 and/or receiver electrodes 190 may be formed with jumpers connecting different portions of the same electrode. In some embodiments, transmitter electrodes 180 and receiver electrodes 190 are separated by one or more layers of insulative material. In some other embodiments, transmitter electrodes 180 and receiver electrodes 190 are separated by one or more substrates; for example, they may be disposed on opposite sides of the same substrate, or on different substrates that are laminated together.

In one embodiment, the transmitter electrodes 180 may extend in a first direction while the receiver electrodes 190 extend in a second direction. As shown in FIG. 2A, the transmitter electrodes 180 extend in one direction, while the receiver electrodes 190 extend in a direction perpendicular to the transmitter electrodes. Of course, other directions are possible (e.g., parallel or other relative orientations).

As will be discussed further below, the areas of localized capacitive coupling between transmitter electrodes 180 and receiver electrodes 190 may be termed "capacitive pixels." The capacitive coupling between the transmitter electrodes 180 and receiver electrodes 190 change with the proximity and motion of input objects in the sensing region associated with the transmitter electrodes 180 and receiver electrodes 190.

Figure 2B:
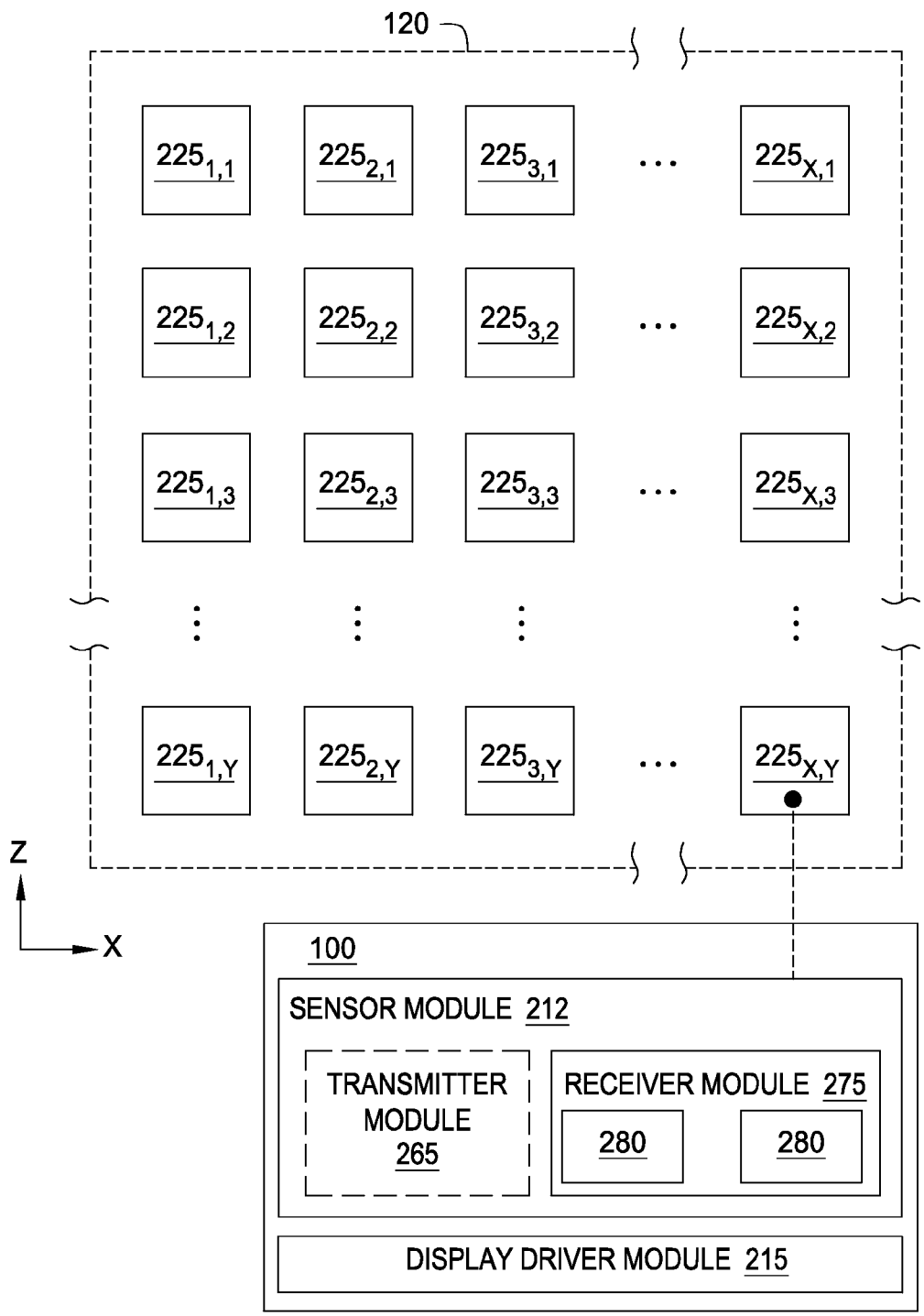

FIG. 2B illustrates a portion of a pattern of capacitive sensing pixels 225 (also referred to herein as capacitive pixels or sensing pixels) configured to sense in the sensing region 120 associated with a pattern, according to some embodiments. Each capacitive pixel 225 may include one of more of the sensing elements described above. In one embodiment, a respective sensor electrode may correspond to each capacitive pixel (i.e., in a 1:1 ratio), and each of the sensor electrodes may have a similar shape, size, and/or alignment with its respective capacitive pixel. Of course, other configurations are also contemplated, such as the embodiment depicted in FIG. 2A, in which the areas of localized coupling between transmitter electrodes and receiver electrodes comprise the sensing pixels 225. In these other configurations, the sensor electrodes need not correspond to the capacitive pixels in the same 1:1 ratio. For clarity of illustration and description, FIG. 2B presents the regions of the capacitive pixels 225 in a pattern of simple rectangles and does not show various other components within the capacitive pixels 225. In one embodiment, the capacitive sensing pixels 225 are areas of localized capacitance (capacitive coupling). Capacitive pixels 225 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive pixels 225, and thus may be used as an indicator of the presence of the input object in the sensing region 120 of the input device.

The exemplary pattern comprises an array of capacitive sensing pixels $225_{X,Y}$ arranged in a matrix array of X columns and Y rows, where X and Y are positive integers. It is contemplated that the pattern of sensing pixels 225 may comprises a plurality of sensing pixels 225 having other configurations, such as polar arrays, repeating patterns, non-repeating patterns, non-uniform arrays a single row or column, or other suitable arrangement. As shown here, the sensing pixels 225 are coupled to the processing system 110 and utilized to determine the presence (or lack thereof) of an input object in the sensing region 120.

In a first mode of operation, at least one sensor electrode within the capacitive sensing pixels 225 may be utilized to detect the presence of an input object via absolute sensing techniques. A sensor module 212 in processing system 110 is configured to drive a sensor electrode in each capacitive pixel 225 with a modulated signal and measure a capacitance between the sensor electrode and the input object (e.g., free space or earth ground) based on the modulated signal, which is utilized by the processing system 110 or other processor to determine the position of the input object.

The various electrodes of capacitive pixels 225 are typically ohmically isolated from the electrodes of other capacitive pixels 225. Additionally, where a capacitive pixel 225 includes multiple electrodes, the electrodes may be ohmically isolated from each other. That is, one or more insulators separate the sensor electrodes and prevent them from electrically shorting to each other.

In a second mode of operation, sensor electrodes in the capacitive pixels 225 are utilized to detect the presence of an input object via transcapacitance sensing techniques. That is, processing system 110 may drive at least one sensor electrode in a capacitive pixel 225 with a transmitter signal and receive resulting signals using one or more of the other sensor electrodes in the capacitive pixel 225, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

In some embodiments, the capacitive pixels 225 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 225.

In other embodiments, "scanning" capacitive pixels 225 to determine these capacitive couplings includes driving with a modulated signal and measuring the absolute capacitance of one or more of the sensor electrodes. In another embodiment, the sensor electrodes may be operated such that the modulated signal is driven onto a sensor electrode in multiple capacitive pixels 225 at the same time. In such embodiments, an absolute capacitive measurement may be obtained from each of the one or more capacitive pixels 225 simultaneously. In one embodiment, the input device 100 simultaneously drives a sensor electrode in a plurality of capacitive pixels 225 and measures an absolute capacitive measurement for each of the capacitive pixels 225 in the same sensing cycle. In various embodiments, processing system 110 may configured to selectively drive and receive with a portion of sensor electrodes. For example, the sensor electrodes may be selected based on, but not limited to, an application running on the host processor, a status of the input device, an operating mode of the sensing device and a determined location of an input device.

A set of measurements from the capacitive pixels 225 form a capacitive image (also referred to as a capacitive frame) representative of the capacitive couplings at the capacitive pixels 225 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more of the sensor electrodes in the capacitive pixels 225 include one or more display electrodes used in updating the display of the display screen. In one or more embodiments, the display electrodes comprise one or more segments of a Vcom electrode (common electrode), a source drive line, a gate line, an anode electrode or cathode electrode, or any other display element. These display electrodes may be disposed on an appropriate display screen substrate. For example, the electrodes may be disposed on the a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, an electrode that is used as both a sensor and a display electrode can also be referred to as a combination electrode, since it performs multiple functions.

Continuing to refer to FIG. 2B, the processing system 110 coupled to the sensing electrodes includes a sensor module 212 and optionally, a display driver module 215. In one embodiment, the sensor module 212 comprises circuitry configured to drive a transmitter signal or a modulated signal onto the sensing electrodes, and to receive the resulting signals on the sensing electrodes during periods in which input sensing is desired. In one embodiment, the sensor module 212 is configured to drive each sensor electrode 225 with a modulated signal, and to measure a capacitance between the sensor electrode 225 and the input object based on the modulated signal. The measured capacitance may then be utilized by the processing system 110 or other processor to determine the position of the input object. The transmitter signal is generally modulated and contains one or more bursts over a period of time allocated for input sensing. The transmitter signal and modulated signal may have an amplitude, frequency and voltage which may be changed to obtain more robust location information of the input object in the sensing region. The modulated signal used in absolute capacitive sensing may be the same or different from the transmitter signal used in transcapacitance sensing. The sensor module 212 may be selectively coupled to one or more of the sensor electrodes in the capacitive pixels 225. For example, the sensor module 212 may be coupled to selected portions of the sensor electrodes and operate in either an absolute or transcapacitance sensing mode. In another example, the sensor module 212 may be coupled to different sensor electrodes when operating in the absolute sensing mode than when operating in the transcapacitance sensing mode.

In various embodiments, the sensor module 212 may comprise a transmitter module 265 configured to drive the sensor electrodes with transmitter signals for transcapacitive sensing. In some embodiments, transmitter module 265 may be configured to drive the sensor electrodes with modulated signals for absolute capacitive sensing. In various embodiments, the sensor module 212 may comprise receiver module 275 that includes circuitry configured to receive a resulting signal with the sensing electrodes comprising effects corresponding to the transmitter signal during periods in which input sensing is desired. In one or more embodiments, the receiver module 275 is configured to drive a modulated signal onto a first sensor electrode in one of the capacitive pixels 225 and receive a resulting signal corresponding to the modulated signal to determine changes in absolute capacitance of the sensor electrode. The receiver module 275 may determine a position of the input object in the sensing region 120 or may provide a signal including information indicative of the resulting signal to another module or processor, for example, a determination module or a processor of the electronic device (i.e., a host processor), for determining the position of the input object in the sensing region 120. In one or more embodiments, the receiver module 275 comprises a plurality of receivers 280, where each receiver may include an analog front end (AFE).

In one or more embodiments, capacitive sensing (or input sensing) and display updating may occur during at least partially overlapping periods. For example, as a combination electrode is driven for display updating, the combination electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period of one display line. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times.

The display driver module 215 includes circuitry configured to provide display image update information to the display of the display device during non-sensing (e.g., display updating) periods. The display driver module 215 may be included with or separate from the sensor module 212. In one embodiment, the processing system 110 comprises a first integrated controller comprising the display driver module 215 and at least a portion of the sensor module 212 (i.e., transmitter module 265 and/or receiver module 275). In another embodiment, the processing system 110 comprises a first integrated controller comprising the display driver module 215 and a second integrated controller comprising the sensor module 212. In yet another embodiment, the processing system comprises a first integrated controller comprising a display driver module 215 and one of a transmitter module 265 or a receiver module 275 and a second integrated controller comprising the other one of the transmitter module 265 and receiver module 275. In one embodiment, a first integrated controller comprises one or more source drivers of the display driver module 215 and one or more receivers of the receiver module 275 and a second integrated controller comprises a timing controller of the display driver. The second integrated controller may further comprise one or more transmitters of the transmitter module 265. Further, the second integrated controller may comprise one or more modules of processing system 110 configured to process the resulting signals. The second integrated controller may comprise a determination module configured to determine positional information for an input object based on the resulting signals. Further, both the first integrated controller and the second integrated controller may be configured to process the resulting signals, wherein first processing is performed in the integrated controller and second processing is performed in the second integrated controller.

Figure 3:
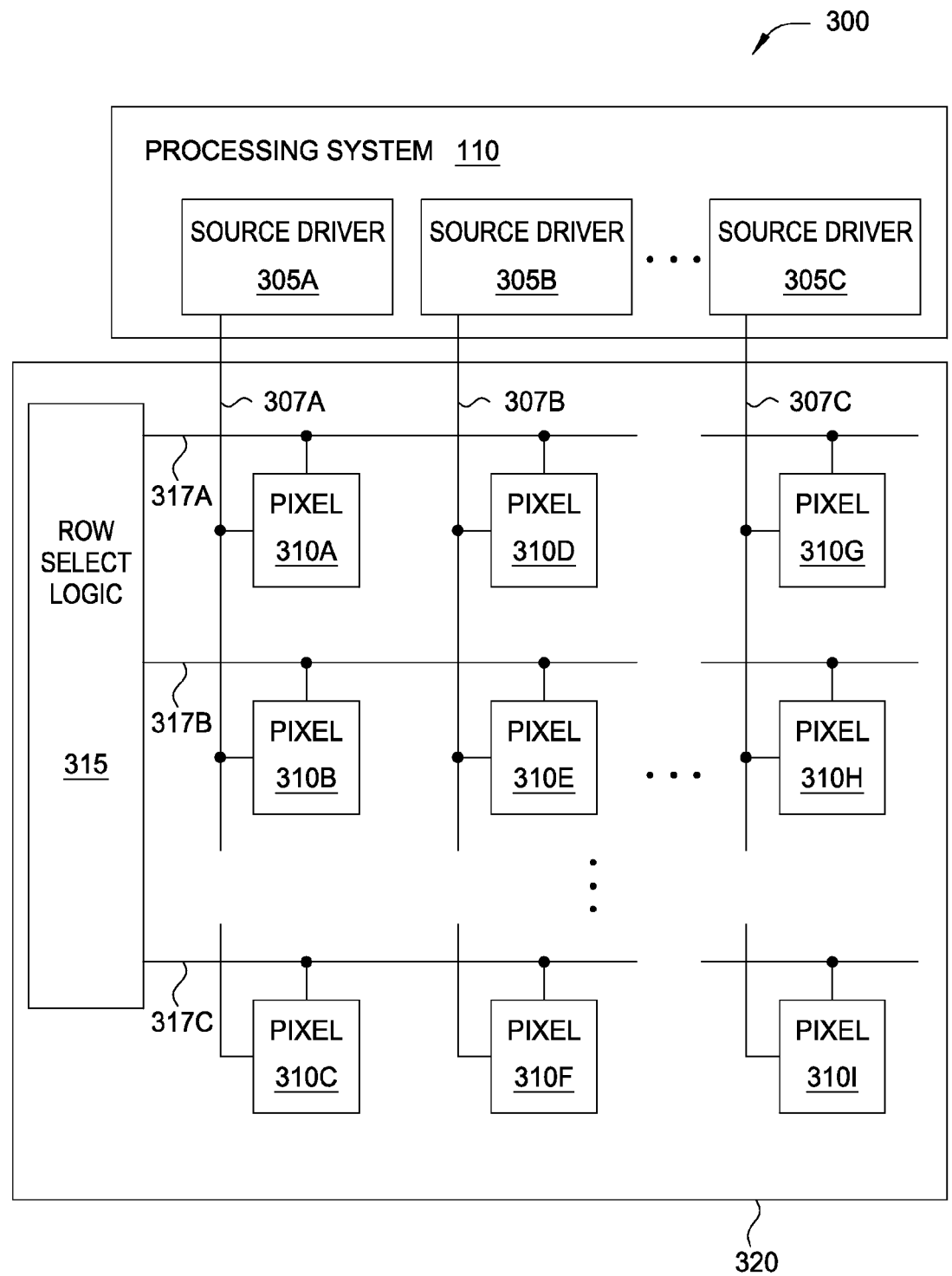
FIG. 3 is a schematic block diagram of a display device, according to one embodiment described herein.

FIG. 3 is a schematic block diagram of a display device 300, according to one embodiment described herein. Specifically, the display device 300 of FIG. 3 may be integrated with an input device and includes processing system 110 and display screen 320. Processing system 110 includes one or more source drivers 305 that are each associated with one or more source lines 307 (also referred to as column lines) in the display screen 320. In one embodiment, processing system 110 and display screen 320 are separate components. For example, the processing system 110 may be an ASIC that is communicatively coupled to the display screen 320 via one or more transmission lines. However, in one embodiment, processing system 110 may be integrated into display screen 320 (e.g., mounted on a common substrate) to form a single component.

The source drivers 305 may receive an input digital signal which is converted to an analog signal and transmitted on the source lines 307. Display screen 320 includes one or more display pixels 310 coupled to row select logic 315 via respective gate lines 317 (also referred to as "rows" or "lines"). The pixels 310 (in contrast to the capacitive pixels discussed above) may be used to display an image on the display screen 320. The display pixels 310 may be used in a light emitting diode (LED), organic LED (OLED), cathode ray tube (CRT), liquid crystal display (LCD), plasma, electroluminescence (EL), or other display technology to display the image.

To update a particular pixel 310, the row select logic 315 activates one of the gate lines 317. In one embodiment, each display pixel 310 may contain a switching element that permits the state of the source line 307 (e.g., a voltage or current value) to change the brightness of the pixel 310. For example, to update display pixel 310D, row select logic 315 using gate line 317A to control the switching element such that the signal generated by source driver 305B changes the voltage associated with display pixel 310D. By coordinating the row select logic 315 with the signals transmitted by the source drivers 305, the processing system 110 and display screen 320 may set the display pixels 310 to respective analog states.

In one embodiment, as discussed above, processing system 110 and display screen 320 may include input sensing circuitry and logic for supporting user input. For the sake of clarity, the embodiments provided below do not discuss input sensing functions. However, these functions are explicitly contemplated. That is, the display circuitry and functions discussed herein may be combined with additional circuitry for enabling user input via input sensing.

Figure 4:
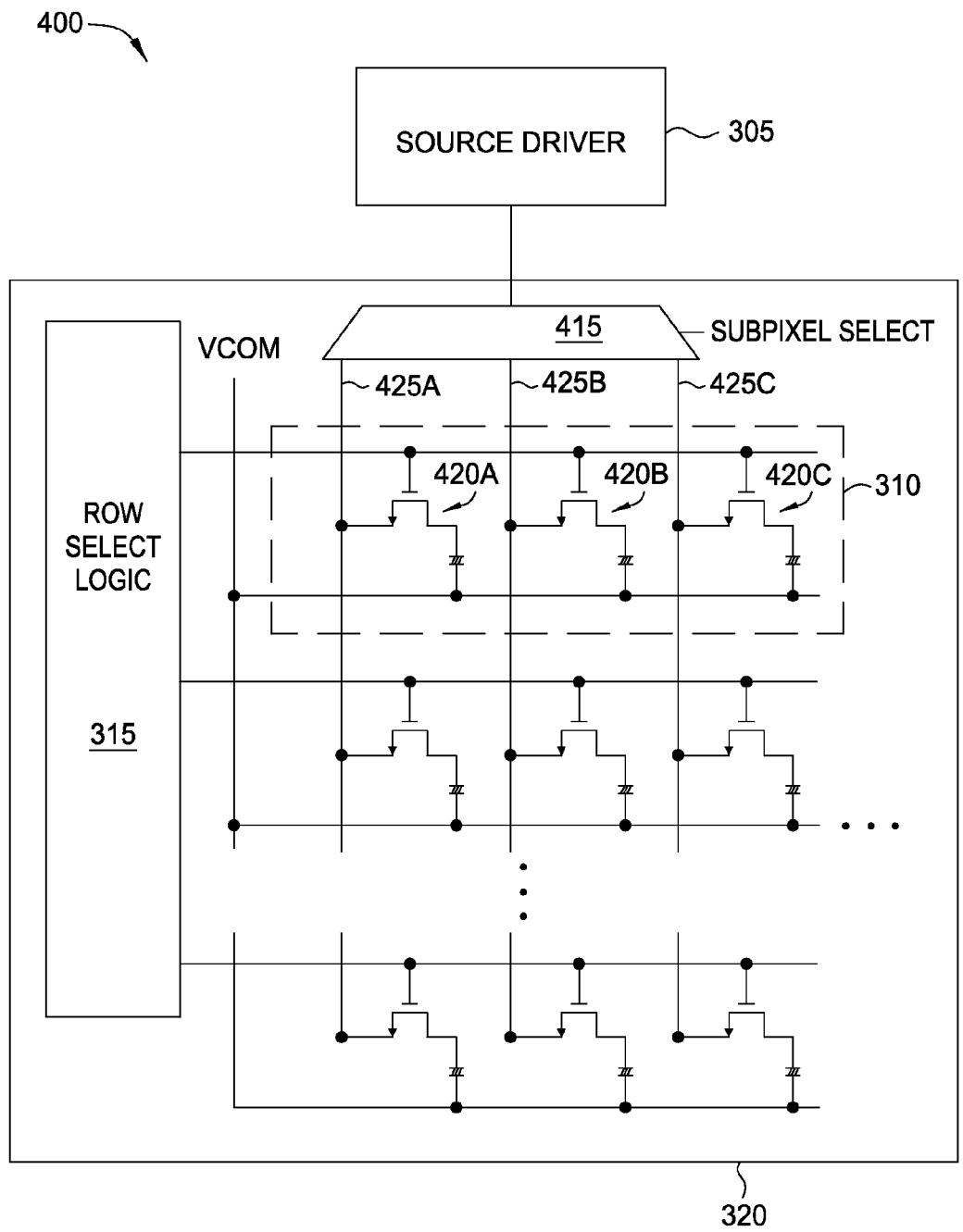
FIG. 4 illustrates a system for updating a source line in a display device, according to one embodiment described herein.

FIG. 4 illustrates a system 400 for updating a source line 425 in a display device, according to one embodiment described herein. Specifically, system 400 includes source driver 305 (i.e., one of the source drivers shown in FIG. 3) coupled to plurality of source lines 425 in display screen 320. As shown here, each source driver 305 is coupled to three source lines 425 which are each associated with a respective display sub-pixel 420. In this embodiment, the display pixels 310 are each divided into three display sub-pixels 420 that are combined to provide the color associated with the display pixel 310—e.g., sub-pixel 420A is the red sub-pixel, sub-pixel 420B is the green sub-pixel, and sub-pixel 420C is the blue sub-pixel. Alternate embodiments may include pixels having a different number of sub-pixels (e.g., four or five sub-pixels). Accordingly, when setting the sub-pixel states, and thus, the color of a display pixel 310, source driver 305 may use three separate drive phases, one for each display sub-pixel 420. To select between the different sub-pixel source lines 425, display screen 320 include multiplexer (mux) 415. Based on a sub-pixel select signal, mux 415 permits the analog state transmitted by source driver 305 to reach only one of the three source lines 425 at any given time. Thus, each source driver 305 may use only one wire to transmit three unique analog states to each sub-pixel source line 425. Moreover, each display pixel is shown including a capacitor representing a liquid crystal pixel, but as discussed above, the display screen is not limited to this type.

Although FIG. 4 illustrates one source driver selectively coupled to three source lines, the present disclosure is not limited to such. Instead, the embodiments described herein may be used in display devices that use a source driver to driver any number of source lines. Moreover, FIG. 4 illustrates using one select signal to couple the source lines 425 to the source driver 305, but in other embodiments it may be preferable to use three different control signals to permit access to the display sub-pixels 420.

Figure 5:
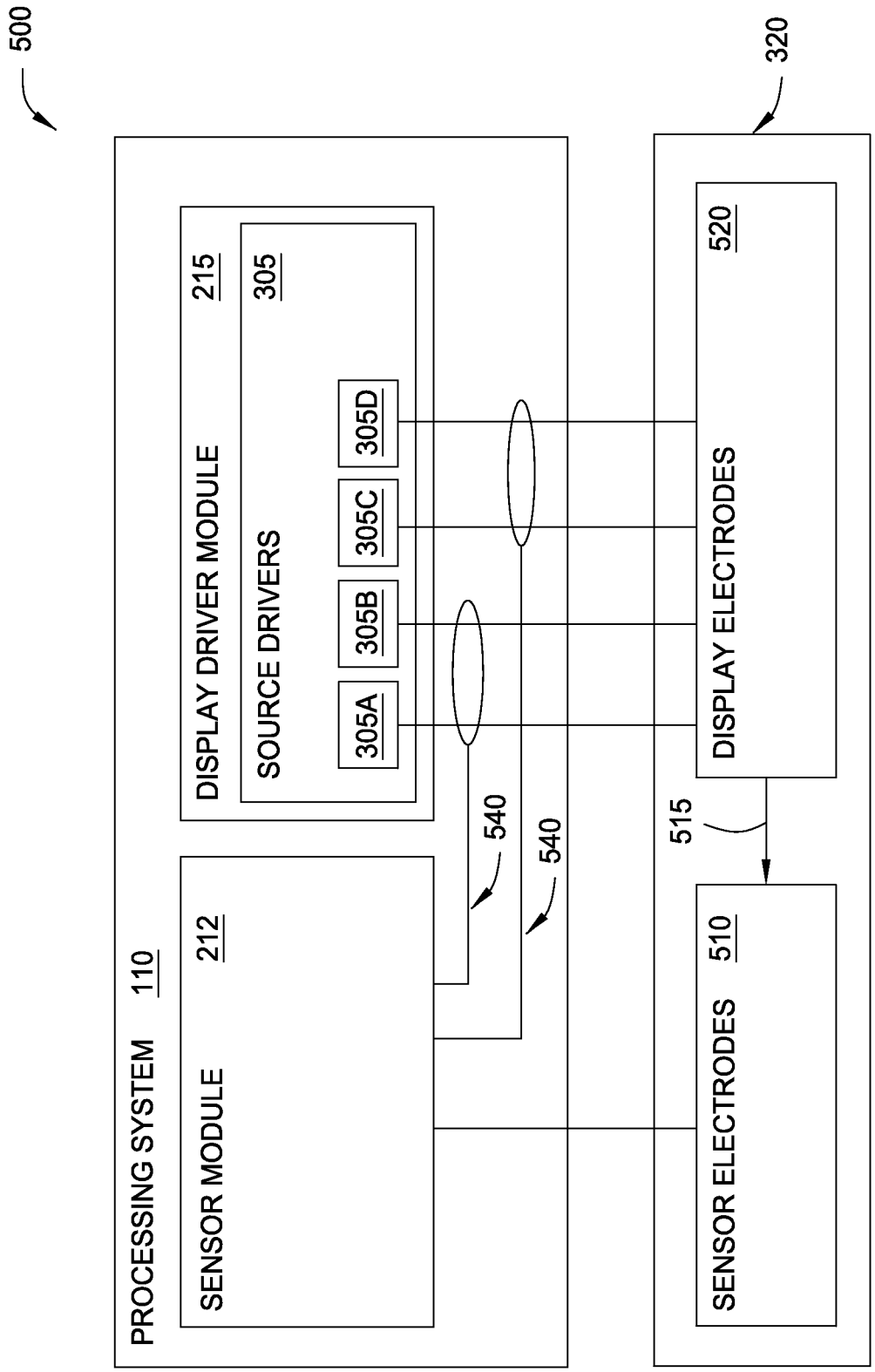
FIG. 5 is a schematic block diagram of an input device, according to one embodiment described herein.

FIG. 5 is a schematic block diagram of an input device 500, according to one embodiment described herein. The input device 500 includes a display screen 320 and a processing system 110, each of which may generally operate as described above. The processing system 110 includes a sensor module 212 and display driver module 215, which were generally described above.

In one embodiment, the sensor module 212 may be configured to perform transcapacitive sensing. The sensor module 212 may include transmitters and receivers that are respectively coupled to transmitter and receiver electrodes of the sensor electrodes 510.

In another embodiment, the sensor module 212 may be configured to perform absolute capacitive sensing. In this embodiment, the sensor module 212 may include receivers capable of modulating and receiving from the sensor electrodes 510.

The display driver module 215 includes a plurality of source drivers 305, which are generally configured to drive the display electrodes 520 to update the display screen 320.

As described above, the processing system 110 includes one or more coupling electrodes 540, each of which is disposed proximate to at least one of the display electrodes 520. To update a display, the display electrodes 520 are driven by source drivers 305, which may also cause charge (i.e., noise) to be coupled into nearby components, such as sensor electrodes 510. By disposing coupling electrodes 540 proximate to the display electrodes 520, the coupling electrodes 540 may also have charge coupled onto them (which is referred to as a coupling signal) when the display electrodes are driven. The coupling signal may be proportional to, and may represent, the amount of charge coupled onto the sensor electrodes 510, so that the coupling signal from coupling electrodes 540 may be used to compensate for the noise introduced into the sensor electrodes 510.

Each of the coupling electrodes 540 is configured to receive a coupling signal based on signal(s) driven onto the corresponding display electrode(s) 520. As defined here, proximate indicates that the display electrode 520 and the coupling electrode 540 have sufficient spatial nearness to allow for a signal driven on one electrode to be detected by the other electrode. As used herein, proximate may include an arrangement where the coupling electrodes 540 and display electrodes 520 are directly coupled (i.e., no spatial separation), and may include capacitive coupling or other types of coupling (e.g., inductive) where there is spatial separation between the coupling electrodes 540 and display electrodes 520. Each coupling electrode 540 may have any shape, size, disposition, and material composition that provide the desired electrical properties for detecting the coupling signal (e.g., current capacity, impedance, capacitance with the display electrode, inductance, and so forth). Accordingly, each coupling electrode 540 may be a wire, a conductive trace, or may have any other suitable geometry.

As stated above, the coupling signal that is detected by a coupling electrode 540 provides a representation of the effect caused by a signal driven on at least one display electrode 520, on a signal on at least one sensor electrode 510. The effect is shown as arrow 515. In other words, the coupling signal represents the noise introduced onto a sensor electrode 510 by driving display signals on a display electrode 520. The properties of the detected coupling signal may be used to compensate for the introduced noise. As shown, the coupling electrodes are each coupled to sensor module 212 in order to offset the noise introduced by the display electrodes 520 onto the sensor electrodes 510 coupled to the sensor module 212. In one embodiment, the processing system 110 may compensate for the introduced noise using an analog form of the coupling signal. In another embodiment, the processing system 110 may convert the coupling signal from the analog domain into a digital signal prior to compensating for the introduced noise.

Though the coupling electrode 540 is shown as included in the processing system 110, the coupling electrode may be disposed in any feasible location within the input device 500, such as being disposed with other processing system logic in an integrated circuit, or being disposed in a separate integrated circuit for the sensor module 212. As will be described further below, in certain embodiments the coupling electrode 540 may also be disposed in the display screen 320.

In one embodiment, the processing system 110 may generate the coupling signal based on data (i.e., the differing voltages) being driven onto the display electrodes 520 by source drivers 305. This generated coupling signal may then be used to offset noise at sensor module 212. In this way, the processing system 110 may emulate the effect of driving the display electrodes without requiring a physical measurement of the coupling signal. In another embodiment, the processing system 110 may selectively use one or both of a measured coupling signal and an emulated coupling signal to compensate for introduced noise.

Figure 6A:
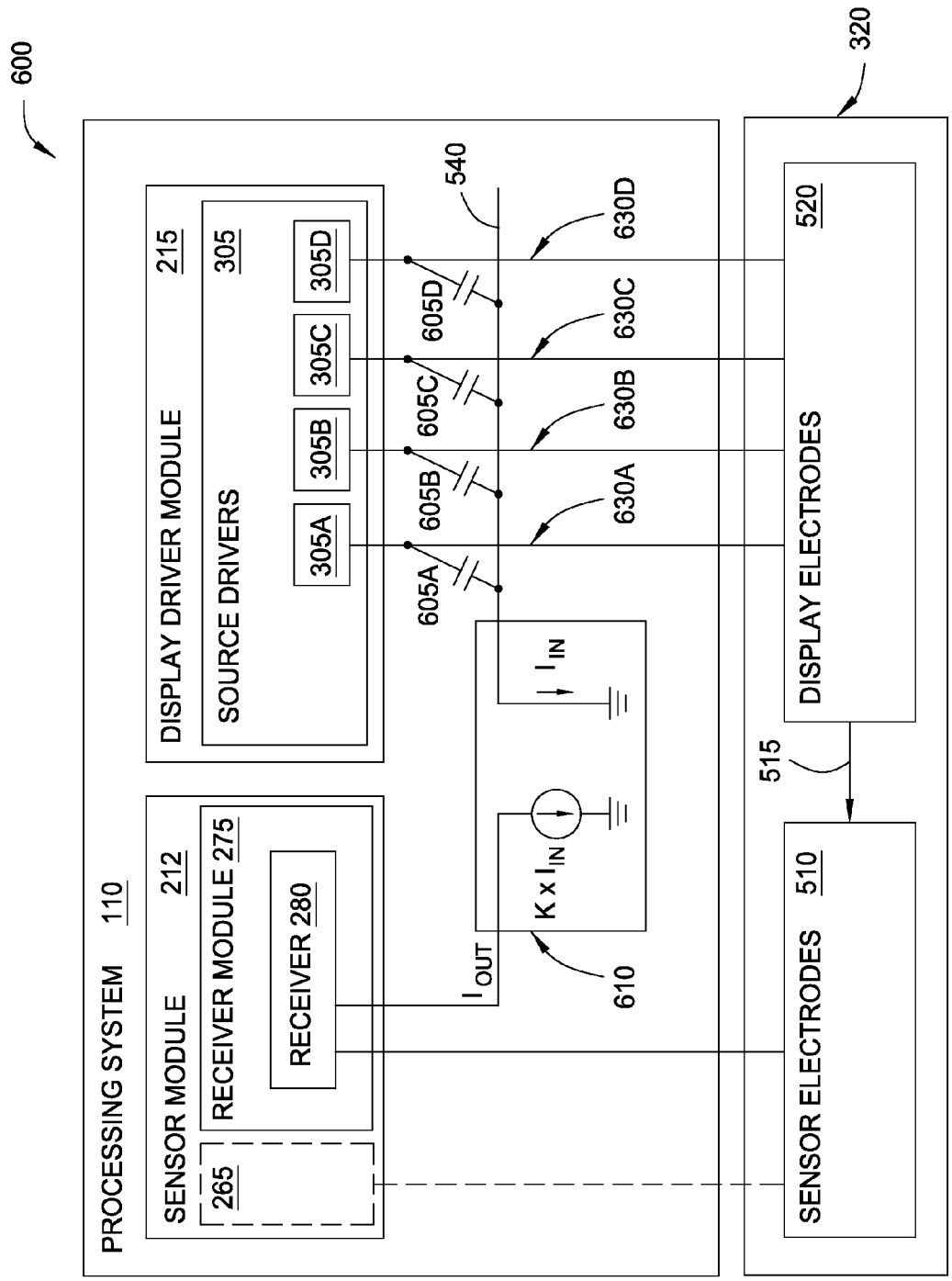
FIGS. 6A and 6B are schematic block diagrams of an input device, according to embodiments described herein.

FIG. 6A is a schematic block diagram of an input device 600, according to one embodiment described herein. The input device 600 includes a display screen 320 and a processing system 110, each of which may generally operate as described above.

In input device 600, the coupling electrode 540 is disposed proximate to each of routing traces 630A-630D (which respectively correspond to source drivers 305A-305D), and the routing traces are coupled to the coupling electrode 540 through a respective coupling capacitance 605. As will be described more fully below, the coupling electrode 540 may be selectively disposed near the routing traces 630A-630D in order to compensate for the noise introduced by the corresponding source lines (in display electrodes 520) coupled to the source driver electrodes. In other words, certain source lines may overlap (or otherwise introduce noise) on one or more sensor electrodes 510, which are connected to receiver 280. To compensate for this noise, the coupling electrode 540 may be disposed proximate to the routing traces 630 that correspond to the noise-introducing source lines. As the display is driven by the source drivers 305, the coupling signal is received on the coupling electrode 540, which may then be used to compensate for the noise introduced to the receiver 280.

As shown, the coupling electrode 540 is connected to a Coarse Background Compensation (CBC) module 610. While not all the elements of a CBC are depicted here, the CBC module 610 may include a current copying circuit (e.g., a current conveyor or current mirror), which generally operates to scale an input current $I_{in}$ by an adjustable scaling factor K to output a current value $I_{out}=K \times I_{in}$. The coupling signal (representing noise introduced by driving the display electrodes) is provided as the input signal to the current copying circuit, which produces a scaled version of the coupling signal at its output. By sourcing (or sinking) this scaled current, the current copying circuit may compensate for the change in charge at the input of the receiver module 275 caused by driving the display electrodes, thereby cancelling some or all of the introduced noise. Consistent with descriptions of the coupling electrode 540 above, the output of the CBC module 610 is coupled to the sensor module 212 (e.g., through receiver module 275).

Of course, other configurations using CBC modules or current copying circuits are possible. For example, a plurality of coupling electrodes 540 may each be capacitively coupled to different groupings of one or more source driver electrodes 530, the groupings corresponding to those source lines that introduce noise onto a respective sensor electrode 510. Each coupling electrode 540 may be configured to provide a coupling signal to a respective CBC module 610. Different CBC modules 610 may have the same or different scaling factors, and each output of the plurality of CBC modules 610 may be connected to a receiver 280 in the receiver module 275 to compensate for the noise introduced to the respective sensor electrode 510.

Figure 6B:
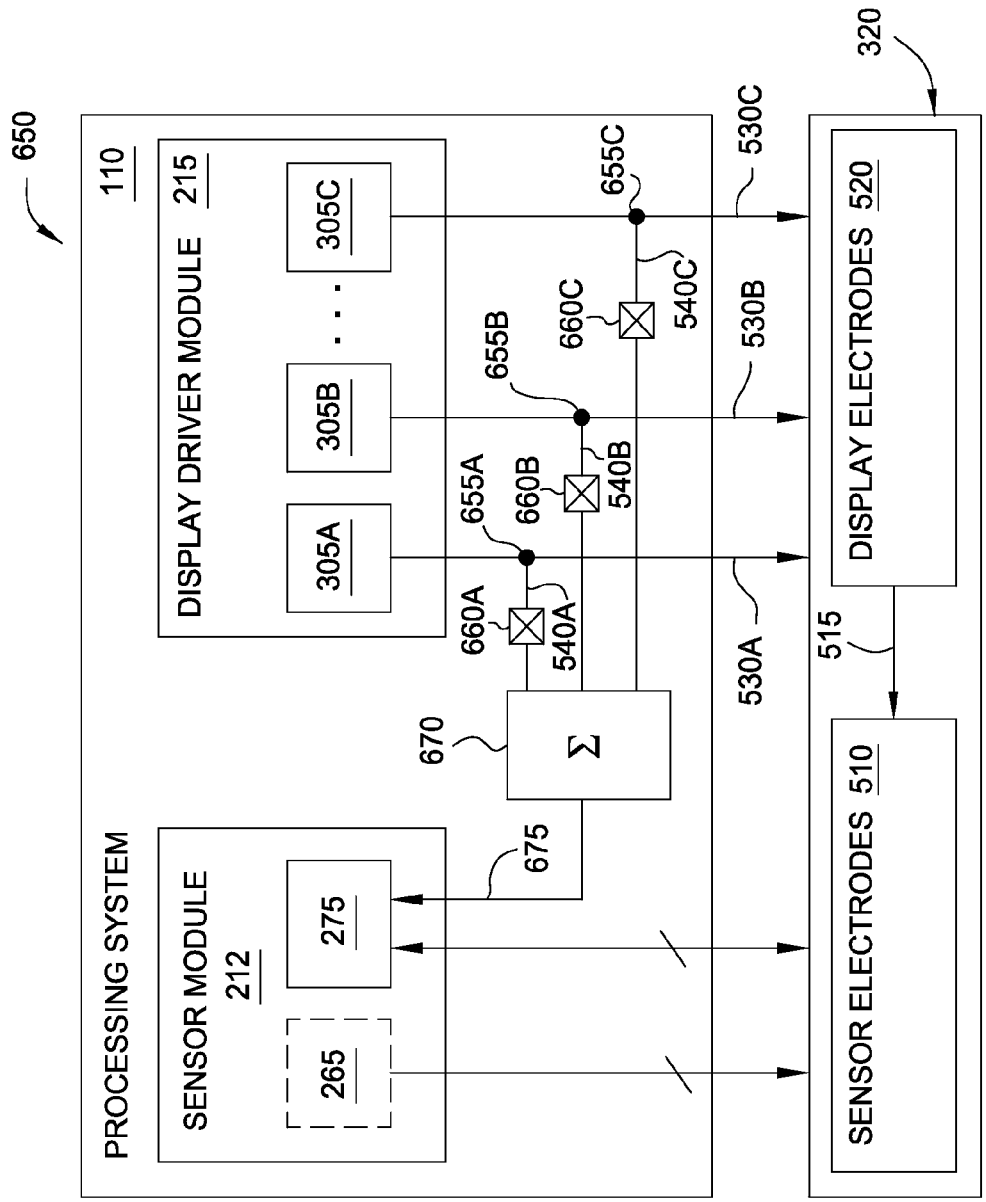

FIG. 6B is a schematic block diagram of an input device 650, according to one embodiment described herein. The display device 650 includes a display screen 320 and a processing system 110, each of which may generally operate as described above. In display device 650, each of the source driver electrodes 530 are directly coupled to a respective coupling electrode 540 at connection points 655. Each coupling signal may be multiplicatively scaled at scaling modules 660 before the scaled signals are summed at summing module 670. The scaling factors may be the same or different for different scaling modules 660. A scaled, summed output 675 of the summing module 670 is coupled to the receiver module 275. The scaled, summed output 675 may be subtracted from the input of one or more receivers in receiver module 275 in order to compensate for the introduced noise.

The coupling signals that are obtained by each of the coupling electrodes 540 may reflect the dynamic output current transmitted by each of the source drivers 305, and in some cases may be a copy of the dynamic output current. Directly coupling the coupling electrodes 540 to the source driver electrodes 530 may provide a more accurate measurement of the noise introduced by the source drivers, as compared to embodiments using capacitive coupling. The coupling signals may be modified (such as by scaling and/or summing the coupling signals, or by performing other processing) in order to determine a cumulative effect of the display updating on the capacitive sensing system. The individual coupling signals, or their determined cumulative effect, may be used to adjust the signals acquired by the sensor electrodes 510 in order to compensate for the introduced noise and thereby improve simultaneous capacitive sensing and display updating.

FIG. 7 is a schematic block diagram of an input device 700, according to one embodiment described herein. The input device 700 includes a display screen 320 and a processing system 110, each of which may generally operate as described above. Input device 700 includes a plurality of display pixels 310 whose values are updated using coordinated signals from row select logic 315 and source drivers 305, similar to the updating process described above with respect to FIG. 3. In input device 700, a separate Vcom electrode 720 is provided for each row of display pixels 310.

A row of dummy pixels 710 is included in display screen 320. While the dummy pixels 710 may otherwise be identical in configuration to the display pixels 310, the dummy pixels 710 are not used to provide an image on the display screen 320. To determine the effects of driving the display electrodes on capacitive sensing, in one embodiment the dummy pixels 710 are each coupled to a respective display driver 305 and a Vcom electrode 705 (which acts as a coupling electrode). The Vcom electrode 705 may be left floating (i.e., not driven with a particular signal) in order to detect charge coupled to the electrode as the display driver 305 drives display electrodes to update the display (i.e., the coupling signal). The Vcom electrode 705 is coupled to receiver module 275, where the detected coupling signal may be used to compensate for noise introduced to the receiver module, consistent with the techniques described above. In an alternate embodiment, a gate line from the dummy pixel row that is segmented into one or more coupling electrodes may be used for noise detection instead of the Vcom electrode 705.

By using a dummy pixel row for the coupling electrode, changes to the capacitance of the liquid crystal elements of the display pixels may be reflected in the computation for the noise cancellation, allowing for a more complete noise cancellation. The liquid crystal capacitance is typically a non-linear value (so that it cannot be accurately represented simply by scaling a detected coupling signal) that is included in the total capacitance cancellation, allowing for more complete noise cancellation.

Figure 8:
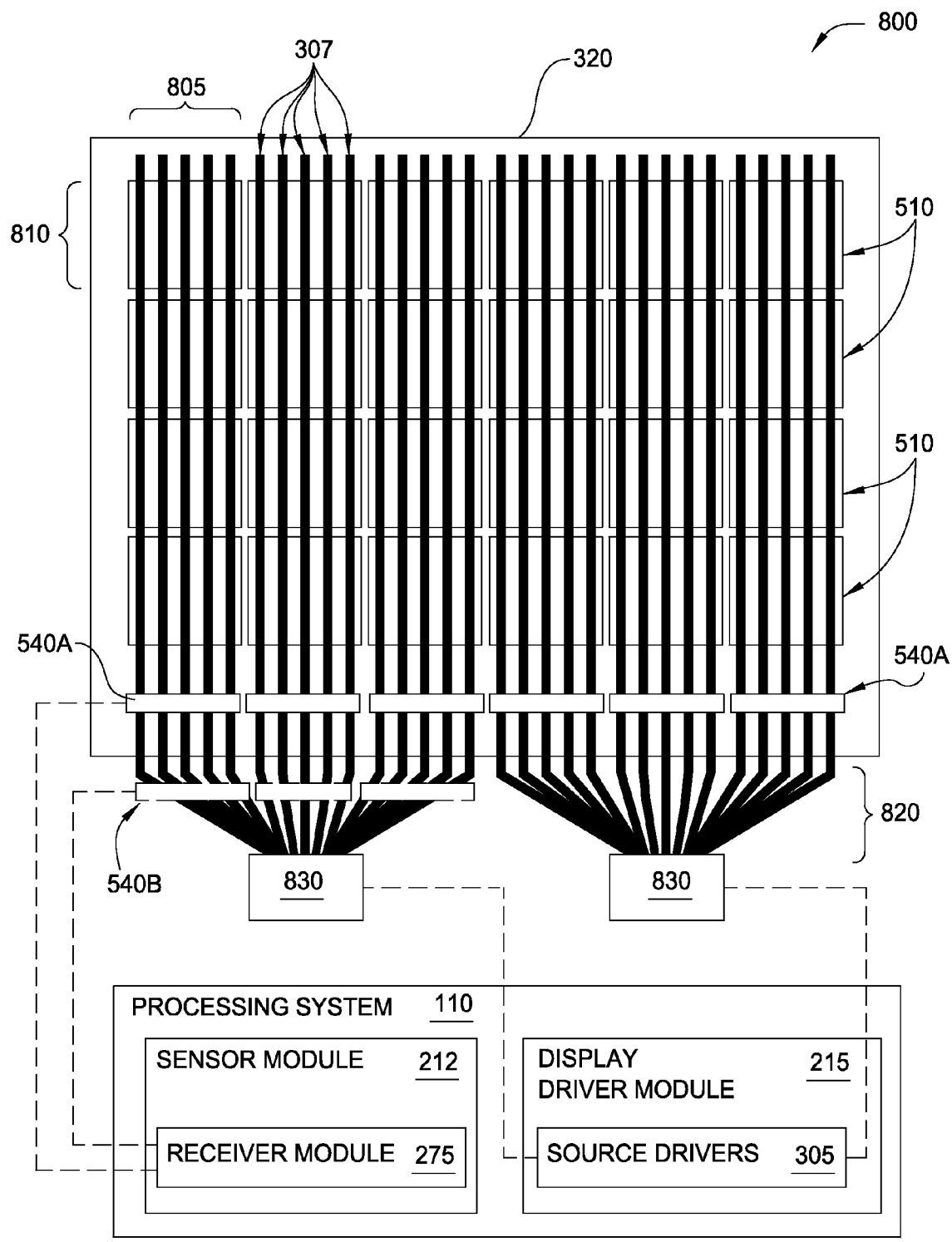
FIG. 8 is a schematic block diagram of an input device, according to one embodiment described herein.

FIG. 8 is a schematic block diagram of an input device 800, according to one embodiment described herein. The input device 800 includes a display screen 320 and a processing system 110, each of which may generally operate as described above. Display screen 320 includes a plurality of source lines 307, which are generally configured to update the display pixels of the display screen, based on signals received from source drivers 305. The signals transmitted by source drivers 305 may be processed using one or more additional logic modules 830, such as a timing or synchronization module, before driving source lines 307. Display screen 320 also includes a plurality of sensor electrodes 510, which may be arranged in a matrix having one or more columns 805 and rows 810. Of course, alternate embodiments may provide arrangements of overlapping sensor electrodes, such as described above with respect to FIG. 2A. While four rows 810 and six columns 805 are shown in this example, any other number may be selected for each. In one embodiment, the ratio and configuration of source lines 307 and sensor electrodes 510 is constant and repeated. As shown, each sensor electrode 510 (as well as each corresponding column 805) is spatially overlapped by five source lines 307. The overlapping between source lines and sensor electrodes may occur across different substrates, or on opposing sides of a common substrate. Although FIG. 8 illustrates that five source lines 307 overlap each sensor electrode 510, any ratio may be selected. For example, other embodiments may include between approximately fifty and 100 source lines or more per column. Alternate embodiments may include columns having varying numbers of source lines and/or sensor electrodes 510 in other arrangements.

The input device 800 also includes a plurality of coupling electrodes 540 (e.g., coupling electrodes 540A, 540B) disposed proximate to one or more source lines 307. Certain source lines 307 may introduce noise onto one or more sensor electrodes 510, because the source lines and sensor electrodes are spatially overlapping, or are otherwise sufficiently close to couple charge onto the sensor electrodes. By disposing the coupling electrode 540 proximate to those source lines 307, a coupling signal may be received by the coupling electrode as the source lines are driven by source drivers to update the display. The coupling signal may then be used to compensate for the noise introduced to the receiver 280 through the sensor electrodes 510.

Though the discussion is directed to the effect of source lines 307 on the sensor electrodes 510, in other embodiments, the coupling electrode 540 may be configured to measure the effect of other display electrodes (such as gate lines) on the sensor electrodes 510. In these embodiments, the coupling electrode 540 may be disposed proximate to these other display electrodes, and may function in generally the same manner as described with respect to source lines 307.

In some embodiments, each coupling electrode 540 may correspond to a particular column or columns 805 of sensor electrodes, or to a predetermined number of source lines 307. As shown here, each coupling electrode 540 corresponds to a single column 805 and to five source lines 307.

In one embodiment, the coupling electrodes 540A may be disposed in a viewable area of the display (e.g., overlapping the area of display screen 320). In an alternate embodiment, the coupling electrodes 540B (shown by the ghosted lines) may be included in the display but are disposed in a portion of the display that is not viewable (i.e., away from the area of display screen 320). For example, coupling electrodes 540B may be disposed in the source line fan out area 820. As the fan out area 820 is relatively dense with source lines 307, coupling electrodes 540B disposed in this area may generally be smaller and may better detect cumulative effects of the source lines.

During example operation of the input device 800, the display driver module 215 may use the source lines 307 to set the voltages on the display pixels included in a selected row. At the same time, the sensor module 212 drives a capacitive sensing signal onto one of the sensor electrodes 510. As shown in FIG. 8, five of these source lines spatially overlap the sensor electrode 520 and introduce noise into the capacitive sensing signal at the sensor electrode. To detect this noise, the coupling electrode 540 in the same column 805 as the active sensor electrode 510 is used to transmit a signal representing the effect that the voltages of the source lines 307 have on the sensor electrode 510. Based on this coupling signal, the sensor module 212 may cancel out this noise from the signals received from the sensor electrodes, thereby improving simultaneous capacitive sensing and display updating performance.

Figure 9:
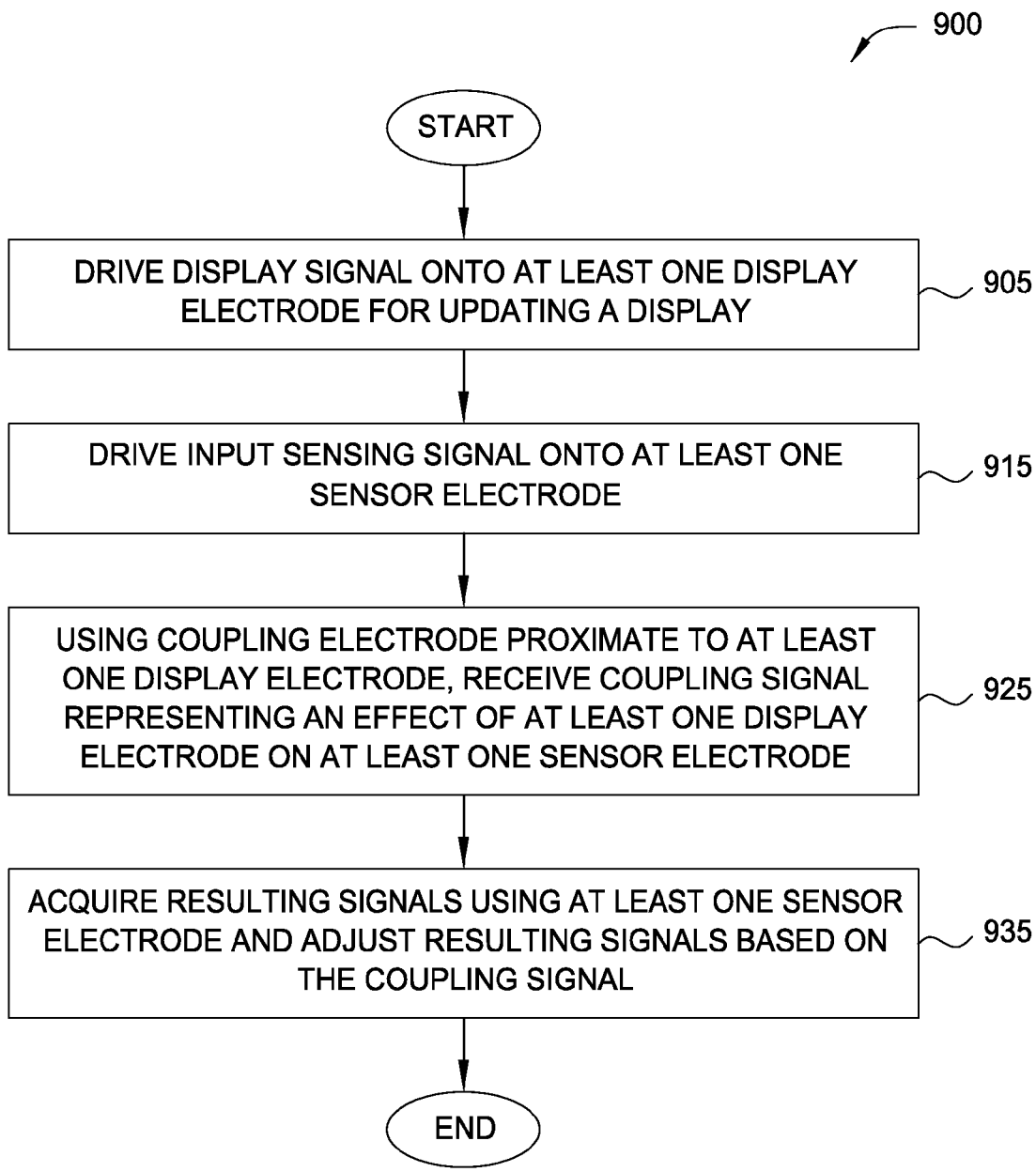
FIG. 9 illustrates a method for display noise cancellation, according to one embodiment described herein.

FIG. 9 illustrates a method 900 for display noise cancellation, according to one embodiment described herein. The method 900 may generally be performed by any of the input devices described above, such as input devices 500, 600, 650, 700, and 800. The above description of the function of these input devices is intended to complement the relatively brief description of the method that follows.

Method 900 begins at block 905, where a display signal is driven onto at least one display electrode for updating a display. The display signal may be driven onto display electrodes by one or more source drivers, which may be included in a display driver module of a processing system.

At block 915, an input sensing signal is driven onto at least one sensor electrode. According to the various embodiments, a sensor module of a processing system may drive the input sensing signal onto one or more of sensor electrodes, transmitter electrodes, and receiver electrodes. Of course, the configuration of the sensor electrodes and the input sensing signal may depend on whether absolute capacitance or transcapacitance sensing techniques will be used to detect input.

In some embodiments, blocks 905 and 915 at least partially overlap in time. Of course, blocks 905 and 915 may also occur in a reverse order, while still overlapping in time. By performing the noise cancellation techniques described herein, display updating and input sensing may occur simultaneously with greater performance (more time available for performing each of display updating and input sensing, fewer display artifacts, and so forth).

At block 925, using a coupling electrode proximate to at least one display electrode, a coupling signal is received that represents an effect of at least one display electrode on at least one sensor electrode. The coupling electrode may be capacitively coupled to the at least one display electrode, or may be coupled through a resistive element to the at least one display electrode. Of course, more than one coupling electrode may be used where each coupling electrode corresponds to one or more source lines of a display or to one or more columns of sensor electrodes. According to the various embodiments, the coupling electrode(s) may be directly connected to a receiver module, or the coupling signal may be processed further (such as by scaling and summing multiple coupling signals, or by performing other calculations).

At block 935, resulting signals that correspond to the driven input sensing signal are acquired using at least one sensor electrode. The resulting signals are received at the receiver module and are processed to indicate the presence or absence of an input object. At block 935, the resulting signals are also adjusted based on the coupling signal received at block 925. The coupling signal may be subtracted or otherwise removed from the resulting signals in order to compensate for the noise introduced by driving the display electrodes. The method 900 ends following completion of block 935.

Further, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

CONCLUSION

Various embodiments of the present technology provide input devices and methods for improving usability. In one embodiment, an input device includes a processing system configured to drive a plurality of display electrodes to update a display. To determine an amount of charge introduced into the sensor electrodes as a result of driving the display electrodes, the processing system includes a coupling electrode proximate to at least one of the display electrodes. The coupling electrode receives a coupling signal representing the effect of a signal from at least one display electrode, on a signal on at least one sensor electrode. The processing device may then compensate for the charge introduced by the signal from the display electrode by adjusting the signals acquired at the sensor electrodes, based on the received coupling signal. Using analog methods to compensate for noise may be particularly advantageous as being simpler in implementation than comparable digital methods, and therefore requiring less power and less area for electronic components.

In some embodiments, the coupling electrode may be capacitively coupled to one or more source driver electrodes. The coupling signal received by the coupling electrode may be provided as an input to a current copying circuit, such as may be included in a Coarse Background Compensation (CBC) current conveyor. The output of the current copying circuit may then be used to adjust the signals acquired at the sensor electrodes in order to compensate for the introduced noise.

In other embodiments, each of a plurality of coupling electrodes may be electrically coupled to a corresponding source driver electrode. The coupling signals obtained by each of the coupling electrodes may reflect the dynamic output current from each of the source drivers. The coupling signals may be modified (such as by scaling and/or summing the coupling signals) in order to determine a cumulative effect of display updating on the capacitive sensing system. The individual coupling signals, or their determined cumulative effect, may be used to adjust the signals acquired at the sensor electrodes in order to compensate for the introduced noise.

In some embodiments, one or more coupling electrodes may correspond to multiple source lines of a display. The coupling electrodes may also correspond to sensor electrodes, or to groups of sensor electrodes. In these embodiments, the coupling electrodes may be disposed in an integrated circuit, or may be disposed on the display itself (for example, proximate to a source line fan out area where display electrodes are wired or otherwise electrically connected to their drivers.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. An input device, comprising:
  a plurality of display electrodes comprising a plurality of source driver electrodes;
  a plurality of sensor electrodes;
  a coupling electrode disposed proximate to at least a first display electrode of the plurality of display electrodes; and
  a processing system coupled to the plurality of display electrodes, the plurality of sensor electrodes, and the coupling electrode, wherein the processing system comprises receiver circuitry having an input coupled with at least one sensor electrode of the plurality of sensor electrodes, wherein the processing system is configured to:
    drive at least the first display electrode of the plurality of display electrodes with a display update signal to update a display, wherein the first display electrode comprises at least one of the plurality of source driver electrodes;
    receive a coupling signal with the coupling electrode, the coupling signal comprising effects corresponding to the display update signal;
    acquire, at the input of the receiver circuitry, resulting signals with the at least one sensor electrode; and
    adjust the resulting signals based on the coupling signal.

2. The input device of claim 1, further comprising a current copying circuit, wherein the coupling electrode is capacitively coupled to one or more of the plurality of source driver electrodes, and wherein an input of the current copying circuit is electrically coupled to the coupling electrode and an output of the current copying circuit is coupled to the receiver.

3. The input device of claim 2, wherein the coupling electrode is disposed on one of the same plane and a parallel plane as a plurality of gate electrodes included in the plurality of display electrodes.

4. The input device of claim 1, wherein the coupling electrode is one of a plurality of coupling electrodes of the input device, wherein each of the plurality of coupling electrodes is directly electrically coupled to a respective one of the plurality of source driver electrodes, wherein adjusting the resulting signals comprises subtracting, from the input of the receiver, a sum of scaled coupling signals received with the plurality of coupling electrodes.

5. The input device of claim 1, wherein the plurality of display electrodes comprises a plurality of common electrodes, and wherein each of the plurality of sensor electrodes comprises at least one of the plurality of common electrodes.

6. The input device of claim 5, wherein the plurality of sensor electrodes comprises a plurality of common electrodes arranged in a matrix configuration.

7. The input device of claim 1, wherein driving the first display electrode with the display update signal to update the display and acquiring resulting signals with the at least one sensor electrode at least partially overlap in time.

8. The input device of claim 1, wherein the plurality of sensor electrodes comprises a plurality of transmitter electrodes and a plurality of receiver electrodes, wherein at least one of the transmitter electrodes comprises a common electrode.

9. A processing system, comprising:
   a display driver module comprising source driver circuitry configured to drive a plurality of source driver electrodes with display update signals to update a display of a display device; and
   a sensor module comprising receiver circuitry coupled to a plurality of sensor electrodes, wherein the sensor module is configured to receive a plurality of resulting signals with the plurality of sensor electrodes;
   wherein the processing system is configured to adjust the plurality of resulting signals based on a coupling signal received with a coupling electrode, wherein the coupling signal comprises effects corresponding to at least one of the display update signals.

10. The processing system of claim 9, wherein adjusting the plurality of resulting signals is performed at an input of the receiver circuitry.

11. The processing system of claim 9, wherein the coupling electrode is capacitively coupled to one or more of the plurality of source driver electrodes.

12. The processing system of claim 11, wherein adjusting the resulting signals is performed by a coarse background compensation module.

13. The processing system of claim 9, wherein at least a portion of the source driver circuitry and at least a portion of the receiver circuitry are disposed on a single integrated circuit.

14. The processing system of claim 13, wherein the coupling electrode is included within the integrated circuit.

15. The processing system of claim 9, wherein driving the plurality of source driver electrodes and receiving the plurality of resulting signals at least partially overlap in time.

16. The processing system of claim 9, wherein the sensor module is further configured to drive the plurality of sensor electrodes with modulated signals, wherein the plurality of resulting signals comprise effects corresponding to the modulated signals.

17. The processing system of claim 9, wherein each of the plurality of sensor electrodes comprises at least one common electrode of a plurality of common electrodes of the display device, wherein the common electrodes are configured to be driven for display updating and input sensing.

18. A method, comprising:
   driving a display update signal onto at least a first display electrode of a plurality of display electrodes for updating a display, the plurality of display electrodes comprising a plurality of source driver electrodes, the first display electrode comprising at least one of the plurality of source driver electrodes;
   receiving a coupling signal with a coupling electrode disposed proximate to the first display electrode, the coupling signal comprising effects corresponding to the display update signal;
   acquiring, using receiver circuitry having an input coupled with at least a first sensor electrode of the plurality of sensor electrodes, resulting signals with the first sensor electrode; and
   adjusting the resulting signals based on the coupling signal.

19. The method of claim 18, wherein the coupling electrode is capacitively coupled to one or more of the plurality of source driver electrodes, and wherein adjusting the resulting signals is performed by a coarse background compensation module.

20. The method of claim 18, wherein driving the display update signal and acquiring resulting signals at least partially overlap in time.

21. The method of claim 18, wherein acquiring resulting signals includes driving an input sensing signal configured for transcapacitive sensing onto at least one of the plurality of sensor electrodes.

22. The method of claim 18, wherein acquiring resulting signals includes driving an input sensing signal configured for absolute capacitive sensing onto at least one of the plurality of sensor electrodes.

* * * * *